United States Patent
Ijäs et al.

(10) Patent No.: US 8,380,252 B2
(45) Date of Patent: Feb. 19, 2013

(54) MODULAR COMMUNICATION APPARATUS

(75) Inventors: Jari Tapio Ijäs, Espoo (FI); Joonas Vartola, Helsinki (FI); Teemu Juhani Linnermo, Porvoo (FI); Esa Petteri Nousiainen, Vantaa (FI)

(73) Assignee: Nokia Corporation, Espoo (FI)

( * ) Notice: Subject to any disclaimer, the term of this patent is extended or adjusted under 35 U.S.C. 154(b) by 625 days.

(21) Appl. No.: 12/377,236

(22) PCT Filed: Nov. 10, 2006

(86) PCT No.: PCT/FI2006/000363
§ 371 (c)(1),
(2), (4) Date: Apr. 5, 2010

(87) PCT Pub. No.: WO2008/017728
PCT Pub. Date: Feb. 14, 2008

(65) Prior Publication Data
US 2010/0184482 A1    Jul. 22, 2010

(30) Foreign Application Priority Data
Aug. 11, 2006  (FI) .................................. 20060324 U

(51) Int. Cl.
*H04M 1/02* (2006.01)
(52) U.S. Cl. ...................... 455/566; 455/572; 455/575.1
(58) Field of Classification Search ................... 455/566
See application file for complete search history.

(56) References Cited

U.S. PATENT DOCUMENTS

| | | | |
|---|---|---|---|
| 5,303,291 A | | 4/1994 | Takagi et al. |
| 5,335,273 A | * | 8/1994 | Takagi et al. ............ 379/433.13 |
| 6,194,900 B1 | * | 2/2001 | Freeman et al. .............. 324/321 |
| 6,259,929 B1 | * | 7/2001 | Kuisma ...................... 455/575.1 |
| 6,396,416 B1 | * | 5/2002 | Kuusela et al. .......... 340/870.28 |
| 6,507,322 B2 | * | 1/2003 | Fang et al. ..................... 343/770 |
| 6,658,268 B1 | * | 12/2003 | Bodnar et al. .............. 455/556.2 |
| 6,789,832 B2 | * | 9/2004 | Gort et al. ..................... 296/37.8 |
| 7,016,708 B1 | * | 3/2006 | Chan et al. .................. 455/569.1 |
| 7,330,548 B2 | * | 2/2008 | Kim et al. ................. 379/433.12 |
| 7,353,051 B2 | * | 4/2008 | Wulff .......................... 455/575.4 |
| 2002/0155864 A1 | * | 10/2002 | Wang .............................. 455/566 |
| 2004/0063463 A1 | * | 4/2004 | Boivin .......................... 455/558 |

(Continued)

FOREIGN PATENT DOCUMENTS

| EP | 0521609 B1 | 1/1993 |
|---|---|---|
| EP | 0617869 B1 | 10/1994 |

(Continued)

OTHER PUBLICATIONS

Office Action received in corresponding Chinese Application No. 200680055580.8, dated May 12, 2011, 10 pages.

(Continued)

*Primary Examiner* — Hai Nguyen
(74) *Attorney, Agent, or Firm* — Harrington & Smith

(57) ABSTRACT

A communication device comprises a first structural module with a power source, as well as second, and third structural modules. The first structural module is between the second and third structural modules. The assembled communication device so formed has an elongated form, in which the second structural module is in a first end, the third structural module is in a second end and the first structural module is at least partly between the second and third structural modules.

20 Claims, 2 Drawing Sheets

U.S. PATENT DOCUMENTS

| | | | |
|---|---|---|---|
| 2004/0259587 A1* | 12/2004 | Chadha | 455/550.1 |
| 2005/0036293 A1* | 2/2005 | Kohnke | 361/730 |
| 2005/0095928 A1* | 5/2005 | Kim et al. | 439/894 |
| 2006/0025182 A1* | 2/2006 | Tushinsky et al. | 455/575.1 |
| 2006/0205447 A1* | 9/2006 | Park et al. | 455/575.1 |

FOREIGN PATENT DOCUMENTS

| | | |
|---|---|---|
| EP | 1489821 A2 | 12/2004 |
| EP | 1703709 A1 | 9/2006 |
| WO | 9312604 A1 | 6/1993 |
| WO | 9749077 A1 | 12/1997 |
| WO | 2003052948 A1 | 6/2003 |
| WO | 2004032463 A2 | 4/2004 |

OTHER PUBLICATIONS

International Search Report and Written Opinion received in corresponding Patent Cooperation Treaty Application No. PCT/FI2006/000363, dated Apr. 26, 2007, 12 pages.

* cited by examiner

MODULAR COMMUNICATION APPARATUS

RELATED APPLICATIONS

This application was originally filed as PCT Application No. PCT/FI2006/000363 filed Nov. 10, 2006, which claims the priority of Finnish Patent Application No. 020060324, filed Aug. 11, 2006.

FIELD OF THE INVENTION

The invention is generally related to the structures of portable communication devices. Especially the invention is related to how technical solutions can be made to better serve the objectives of sustainable development and ecological consumption.

BACKGROUND OF THE INVENTION

Portable communication devices constitute a significant part of the material goods that are consumed around the world. Communication is a human basic need, so it is not too much to assume that sooner or later every person in the world will have some kind of an electronic communications device at his or her disposal. The technology advances fast, fashion trends change, and there is a large number of companies worldwide trying to maintain and increase their businesses related to manufacturing, selling and use of communication devices. From the ecological viewpoint it would be recommendable to bring forward certain considerations. The amount of waste that comes from used communication devices and their parts should be kept reasonable. If possible, the communication device should be so designed that even if some single part wears out, gets broken or becomes obsolete still does not force to change the whole device to a new one. Especially parts that include constituents or components that are rare, difficult to handle or environmentally hazardous should be easy to recycle appropriately or to otherwise forward to proper waste management.

BRIEF DESCRIPTION OF THE INVENTION

An objective of the present invention is to present a structural solution for a communication device, which serves ecological aims.

The objectives of the invention are achieved by assembling a communication device from modules, which are replaceable and the parts of which may serve many different purposes.

Characteristic to the communication device according to the invention is that which has been presented in the characterising part of the independent claim.

Figure 1:
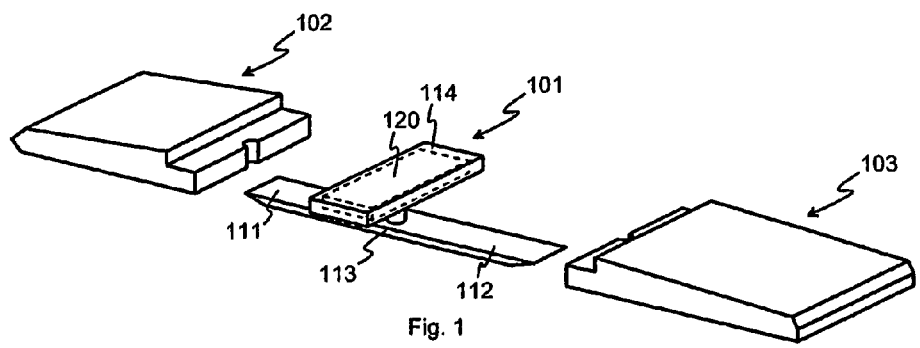
Figure 2:
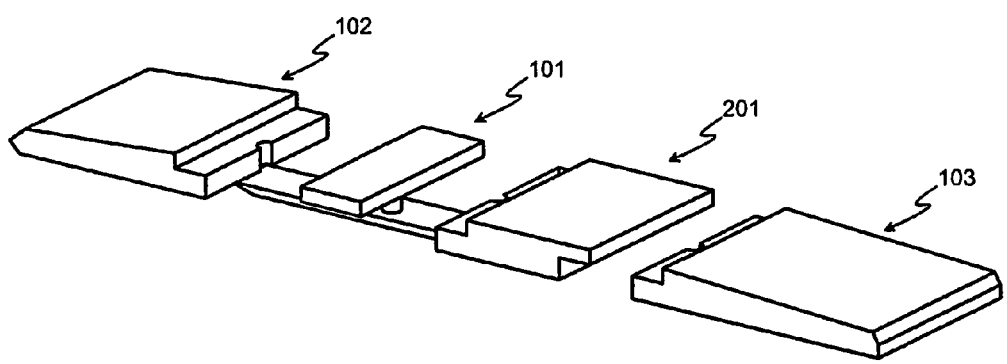
Figure 3:
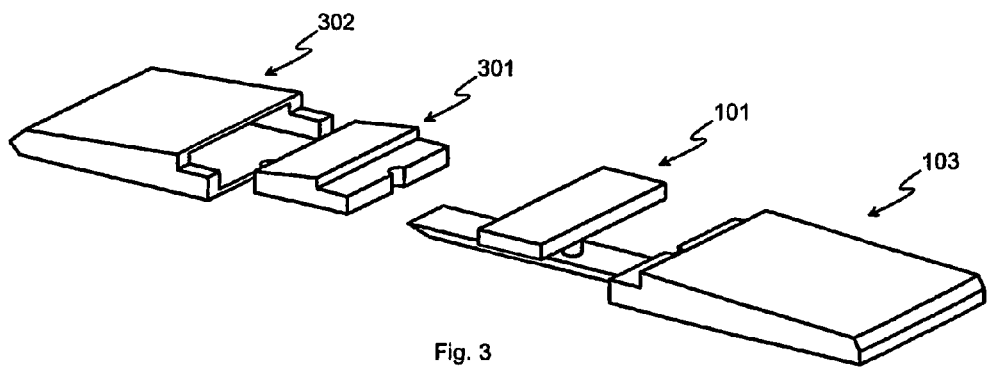
Figure 4:
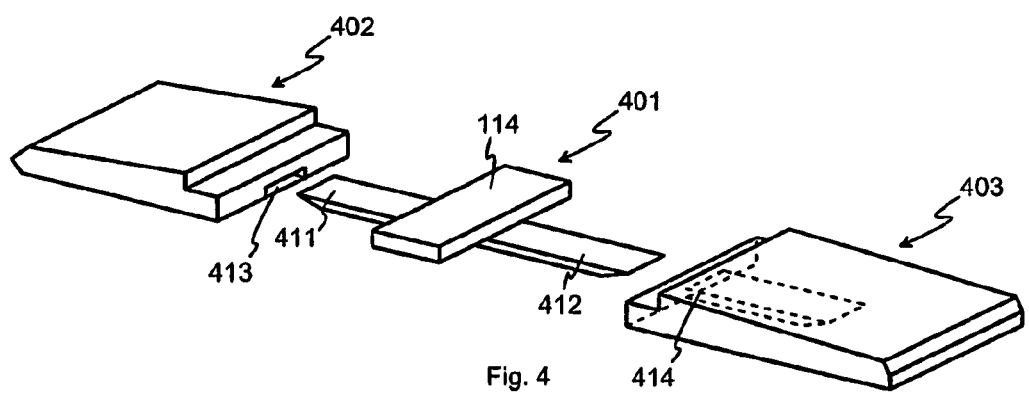
Figure 5:
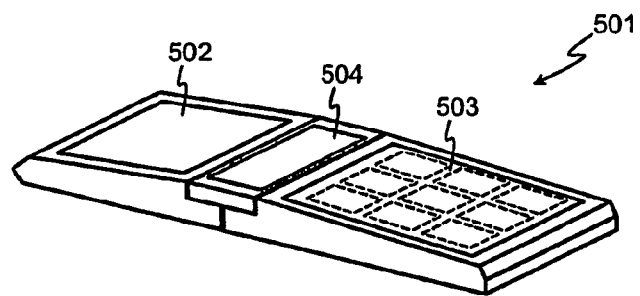

FIG. 1 illustrates a communication apparatus according to an embodiment of the invention, FIG. 2 illustrates a communication apparatus according to another embodiment of the invention, FIG. 3 illustrates a communication apparatus according to yet another embodiment of the invention, FIG. 4 illustrates a communication apparatus according to yet another embodiment of the invention, and FIG. 5 illustrates an assembled communication device according to an embodiment of the invention.

DETAILED DESCRIPTION OF THE INVENTION AND ITS EMBODIMENTS

FIG. 1 is an exploded view of a communication device, which comprises three structural modules. The middle module 101 comprises a power source 120 (shown here only schematically), which is most advantageously a fuel cell that utilises hydrogen. An estimated useful lifetime of a fuel cell is even up to 5-10 years, while taken the battery technology as known today, batteries of mobile communication devices last typically at most about 2 years. A fuel cell has also other advantageous properties, like easy recyclability (the cell comprises a lot of nickel) and the possibility of producing the required raw material of energy (hydrogen) locally by using renewable energy sources.

The communication device is assembled by attaching the second module 102 on one side of the first module 101 and a third module 103 on the other side of the first module 101. An assembled communication device has an elongated form, of which the second structural module 102 forms the first and the third structural module 103 forms the second end. The first structural module 101 is located between the second and third modules.

The first structural module 101 has not only an attaching function but a function of mechanically supporting the structure. For this purpose the form of the first module consists of two parts. The elongated part 113, the ends of which can be designated as the first protrusion 111 and the second protrusion 112, is parallel to the longitudinal axis of the elongated form of the assembled communication device. The first protrusion 111 supports mechanically the second structural module 102, and the second protrusion 112 supports mechanically the third structural module 103. In this embodiment the protrusios are against the outer surfaces of the second and third structural modules in an assembled communication device. Alternatively, at least one of them could be at least partly inside the corresponding structural module in an assembled communication device, if the respective structural module has a receptive cavity for this purpose. FIG. 4 is an exploded view of a communication device, in which the first elongated protrusion 411 of the first structural module 401 is adapted to fit in the slot 413 in the second structural module 402. Similarly the second elongated protrusion 412 of the first structural module 401 is adapted to fit in a slot 414 drawn in dashed line in the third structural module 403.

Placing the power source to the first structural module 101 is advantageous, because the first structural module 101 constitutes a central part of the structure of the assembled communication device. The user may, at his or her will, replace the structural modules at the ends with other modules, but it is very probable that all, even mutually alternative modules have functionalities that require electric current, which they get from the power source included in the first structural module 101.

FIG. 2 illustrates, how it is possible to add other structural modules to the structure for example by attaching them between the first module 101 and one of the second 102 and third 103 modules. FIG. 3 illustrates, how it is possible to add other structural modules to the structure for example by attaching them at least partly inside one of the second 102 and third 103 modules.

The functional parts of the communication device, like a transmitter and a receiver, signal processing circuits, keypad and touch area or other input means, display or other indicator means, microphone, loudspeaker and the like can be placed in the structural modules in various ways. According to one advantageous embodiment each module represents a certain functionality or a combination of certain functionalities, so that the user may use the modules at his or her disposal to assemble a communication device that best responds to the actual needs each time. Examples of such functional modules are a telephone module of a cellular radio system, a data transfer module, FM radio receiver module, media storage and retrieval module (MP3 player), positioning module, memory module and so on. This list is not limiting from the viewpoint of the invention. Due to the easy exchangeability of the modules, it is easy to replace for example a broken, lost or obsolete module with a new one without having to replace the whole communication device.

FIG. 5 shows one example of how in an assembled communication device 501 there are input means (here: a touch area 503, which technically is a touch-sensitive display part) in one of the structural modules, and a display 502 in another one of the structural modules. The touch area 503 is on the same side of the communication device as the display 502. In the assembled communication device 501 the touch-sensitive display part is adjacent to the display 502 and separated therefrom by only a surface of a transversal part of the first structural module. Together the touch-sensitive display part, the display 502 and said surface of the transversal part cover an essentially whole side surface of the assembled communication device 501.

At least part of the surface of at least one module may comprise a so-called e-ink area, which is an area functioning as an electrically controlled note- and display area. As an example, an electrically controlled note- and display area 504 appears on a surface of the first structural module in FIG. 5, but one could alternatively or additionally be in at least one of the other modules. For the materials of the modules, it is advantageous to use recycled, recyclable and/or biodegradable materials.

The invention claimed is:

1. A communication device, comprising:
a first structural module, which comprises a power source,
a second structural module, and
a third structural module;
the first structural module is adapted to attach between the second and third structural modules, so that when the second and third structural module are attached to the first structural module the assembled communication device so formed has an elongated form, in which the second structural module is in a first end, the third structural module is in a second end and the first structural module is at least partly between the second and third structural modules.

2. A communication device according to claim 1, wherein the first structural module comprises a first elongated protrusion, which in the assembled communication device is essentially parallel to a longitudinal axis of the elongated form and which is adapted to form a mechanical support for the second structural module.

3. A communication device according to claim 2, wherein the assembled communication device the first elongated protrusion is against the outer surface of the second structural module.

4. A communication device according to claim 2, wherein the assembled communication device the first elongated protrusion is inside the second structural module.

5. A communication device according to claim 1 wherein the first structural module comprises a second elongated protrusion, which in the assembled communication device is essentially parallel to a longitudinal axis of the elongated form and which is adapted to form a mechanical support for the third structural module.

6. A communication device according to claim 5, wherein the second elongated protrusion is adapted to point into an opposite direction than the first elongated protrusion.

7. A communication device according to claim 5, wherein the assembled communication device the second elongated protrusion is against the outer surface of the third structural module.

8. A communication device according to claim 5, wherein the assembled communication device the second elongated protrusion is inside the third structural module.

9. A communication device according to any of claim 6 wherein the first and second elongated protrusions are the opposite ends of the same elongated part.

10. A communication device according to claim 9, wherein the first structural module comprises said elongated part a part transversal thereto, which is located transversally essentially at the middle of the elongated part.

11. A communication device according to claim 10, wherein the thickness of the first structural module from a top surface of the trans-versal part to a bottom surface of the elongated part is in the assembled communication device essentially the same as the thickness of the assembled communication device.

12. A communication device according to claim 1 wherein said communicationdevice comprises a fourth structural module , which is adapted to attach between the first structural module and either the second or third structural module, so that when the structural modules are attached to each other, the assembled communication device so formed has an elongated form, in which the second structural module is in a first end, the third structural module is in a second end, and the first and fourth structural modules are at least partly between the second and third structural modules.

13. A communication device according to claim 12 wherein said communication devioce comprises a fifth structural module, which is adapted to attach inside the second or third structural module.

14. A communication device according to claim 1 wherein the power source comprises a fuel cell.

15. A communication device according to claim 1, wherein at least one of the structural modules comprises a touch area.

16. A communication device according to claim 1 wherein at least one of the structural modules comprises a display.

17. A communication device according to claim 1, wherein at least one of the structural modules comprises an electrically controlled note and display area.

18. A communication device according to claim 1, wherein one of the structural modules comprises a touch area, and another one of the structural modules comprises a display.

19. A communication device according to claim 18, wherein the assembled communication device said touch area is on the same side of the communication device as said display.

20. A communication device according to claim 18, wherein:
said touch area is a touch-sensitive display part located in the third structural module,
said display is located in the second structural module,
in the assembled communication device said touch-sensitive display part is adjacent to said display and separated therefrom by only a surface of a transversal part of the first structural module, so that together said touch-sensitive display part, said display and said surface of said transversal part cover an essentially whole side surface of the assembled communication device.

* * * * *

UNITED STATES PATENT AND TRADEMARK OFFICE
CERTIFICATE OF CORRECTION

| | | |
|---|---|---|
| PATENT NO. | : 8,380,252 B2 | Page 1 of 1 |
| APPLICATION NO. | : 12/377236 | |
| DATED | : February 19, 2013 | |
| INVENTOR(S) | : Jari Tapio Ijäs et al. | |

It is certified that error appears in the above-identified patent and that said Letters Patent is hereby corrected as shown below:

In the Claims:

In Claim 9:
Column 4, line 8, "any of" should be deleted.

In Claim 11:
Column 4, line 17, "trans-versal" should be deleted and -- transversal -- should be inserted.

In Claim 12:
Column 4, line 22, "communicationdevice" should be deleted and -- communication device -- should be inserted.

In Claim 13:
Column 4, line 32, "deviocecomprises" should be deleted and -- device comprises -- should be inserted.

In Claim 17:
Column 4, lines 41-42, "wherein at least" should be deleted and
-- wherein the surface of at least -- should be inserted.

Signed and Sealed this
Seventh Day of May, 2013

Teresa Stanek Rea
*Acting Director of the United States Patent and Trademark Office*